United States Patent [19]
Jukoff

[11] 4,044,992
[45] Aug. 30, 1977

[54] HIGH ENERGY LOSS FLUID FLOW CONTROL DEVICE

[75] Inventor: David Jukoff, Northridge, Calif.

[73] Assignee: Consolidated Controls Corporation, Bethel, Conn.

[21] Appl. No.: 647,906

[22] Filed: Jan. 9, 1976

[51] Int. Cl.² .............................................. F16K 47/06
[52] U.S. Cl. ................................... 251/126; 251/127; 138/43; 138/46
[58] Field of Search ................. 251/127, 126; 138/43, 138/46

[56] References Cited

U.S. PATENT DOCUMENTS

| 2,323,115 | 6/1943 | Bryant | 138/43 |
| 3,095,006 | 6/1963 | Smith | 138/43 |
| 3,143,145 | 8/1964 | Kauss | 251/126 X |
| 3,871,616 | 3/1975 | Taylor | 251/368 X |

*Primary Examiner*—Arnold Rosenthal

*Attorney, Agent, or Firm*—Mason, Kolehmainen, Rathburn & Wyss

[57] ABSTRACT

A high energy loss fluid flow control device comprising a body defining a chamber in communication with a fluid inlet passage and fluid outlet passage at one end of the chamber; a hollow tubular member mounted in said chamber open at one end adjacent said outlet passage and formed with a helical, internally projecting land extended between said outlet passage and an inlet opening in the wall of said member in communication with said inlet passage, a valve member mounted in said tubular member for axial translation relative thereto including an outwardly projecting helical land extending between an end of said valve member and spaced between adjacent turns of said helical land of said tubular member thereby defining a helical fluid flow passage between said lands extending between said inlet opening and said outlet end of said tubular member.

6 Claims, 9 Drawing Figures

HIGH ENERGY LOSS FLUID FLOW CONTROL DEVICE

BACKGROUND OF THE INVENTION

1. Field of the Invention

The present invention relates to high energy loss fluid flow control devices and more particularly relates to devices sometimes known as "let down valves" used for reducing the pressure of fluids received from high pressure fluid sources as developed or used in various processes such as coal gasification, petroleum refining and the like. The fluid flow control device of the present invention is an improvement on the high energy loss fluid flow control device shown and described in a copending U.S. Pat. application Ser. No. 619,709 filed Oct. 6, 1975 which application is assigned to the same assignee as the present application.

Devices in accordance with the present invention are used in the controlled reduction of high fluid pressures down to lower pressures such as atmospheric or less and devices in accordance with the present invention are especially well adapted and designed for handling high temperature fluids including both liquids and gases that are often involved in various industrial processes. In addition, the high energy loss fluid flow control devices are useful where the fluid media contains particles of solid materials which may be abrasive and corrosive and thus have been the cause of much difficulty in prior art fluid flow control devices.

2. Description of the Prior Art

Several high pressure fluid energy loss control devices are shown in U.S. Pat. Nos. 3,451,404; 3,513,864; 3,207,181; 3,331,396; 3,426,797 and 3,514,074. Fluid flow control devices as shown in some of the aforementioned patents use parallel flow passages and these passages are sometimes formed with a plurality of disks having slots, grooves or crescent shaped passages formed therein. In the disk devices, the fluid pressure is reduced in discrete steps or increments rather than on a continuous basis and in the parallel flow devices, the pressure reduction is changed by the addition or subtraction of parallel flow paths extending between the high pressure and low pressure regions.

It is an object of the present invention to provide a new and improved high energy loss fluid flow control device and, more particularly, it is an object of the invention to provide a device of the character described which is particularly well suited for use in coal gasification systems wherein the fluid medium is supplied at high pressures and temperatures, and often contains highly abrasive solid particles such as char particles and the like.

Another object of the present invention is to provide a new and improved fluid flow control device of the character described wherein a maximum pressure reduction is obtained with a minimum of noise being generated as the fluid medium is throttled or expanded from high pressure to low pressure condition.

Another object of the present invention is to provide a new and improved fluid flow control device of the character described wherein the pressure reduction is accomplished in a continuous basis rather than by several discrete steps or increments like many of the prior art devices.

Yet another object of the present invention is to provide a new and improved high energy loss fluid flow control device wherein expansion of the fluid or flashing thereof is achieved in a helical flow path which may be increased in cross-sectional flow area as the fluid moves from the high to the low pressure regions in the device.

Yet another object of the present invention is to provide a new and improved high energy loss fluid flow control device for low level noise pressure reduction wherein a pair of members employing interfitting helical lands or threads are provided to define a helical flow path for the fluid, which path is adjustable by axial movement of one of the members relative to the other without requiring relative rotation.

Yet another object of the present invention is to provide a new and improved high energy loss fluid flow control device of the character described wherein a plurality of spaced expansion cavities are provided downstream along the helical flow path to provide discrete areas of high energy dissapation.

Another object of the invention is to provide a new and improved fluid flow control device of the character described particularly designed to have components formed of temperature resistant and wear resistant materials including ceramics and/or ceramic coated surfaces for direct contact with the flow of fluid at extremely high temperatures.

BRIEF SUMMARY OF THE INVENTION

The foregoing and other objects and advantages of the present invention are accomplished in one of the illustrated embodiments herein which comprises a high energy loss fluid flow control device having a body with a chamber defined therein in communication with a fluid inlet passage and a fluid outlet passage at one end of the chamber. A hollow tubular trim member or sleeve is mounted in the chamber and is open at one end adjacent the outlet passage. The tubular trim sleeve is formed with a helical, internally projected land or thread which extends between the outlet end and is in communication with the fluid inlet passage through an inlet opening in the wall of the tubular trim sleeve. A valve member is mounted in coaxial alignment within the tubular trim sleeve for axial translation relative thereto and the valve member includes an outwardly projecting helical land or thread which extends between an end of the valve member and is spaced between adjacent turns of the helical thread or land of the tubular trim sleeve, therewith defining a helical fluid flow passage extending between the inlet opening in the tubular trim sleeve and the outlet end of the valve member. The valve member is mounted for longitudinal translation within the hollow trim sleeve to open and close the inlet opening and to adjust the spacing between the interfitting lands forming the helical flow passage which is adjustable and expansible in cross-section between the inlet opening and the outlet passage. Adjacent the outlet end, the valve member is provided with a seating surface for seating engagement against an annular surface formed in the body of the device around the outlet passage so that the valve member may be closed to stop the flow of fluid through the helical flow passage.

BRIEF DESCRIPTION OF THE DRAWINGS

For better understanding of the present invention, reference should be had to the following detailed description taken in conjunction with the drawings, in which.

DESCRIPTION OF THE PREFERRED EMBODIMENTS

Figure 1:
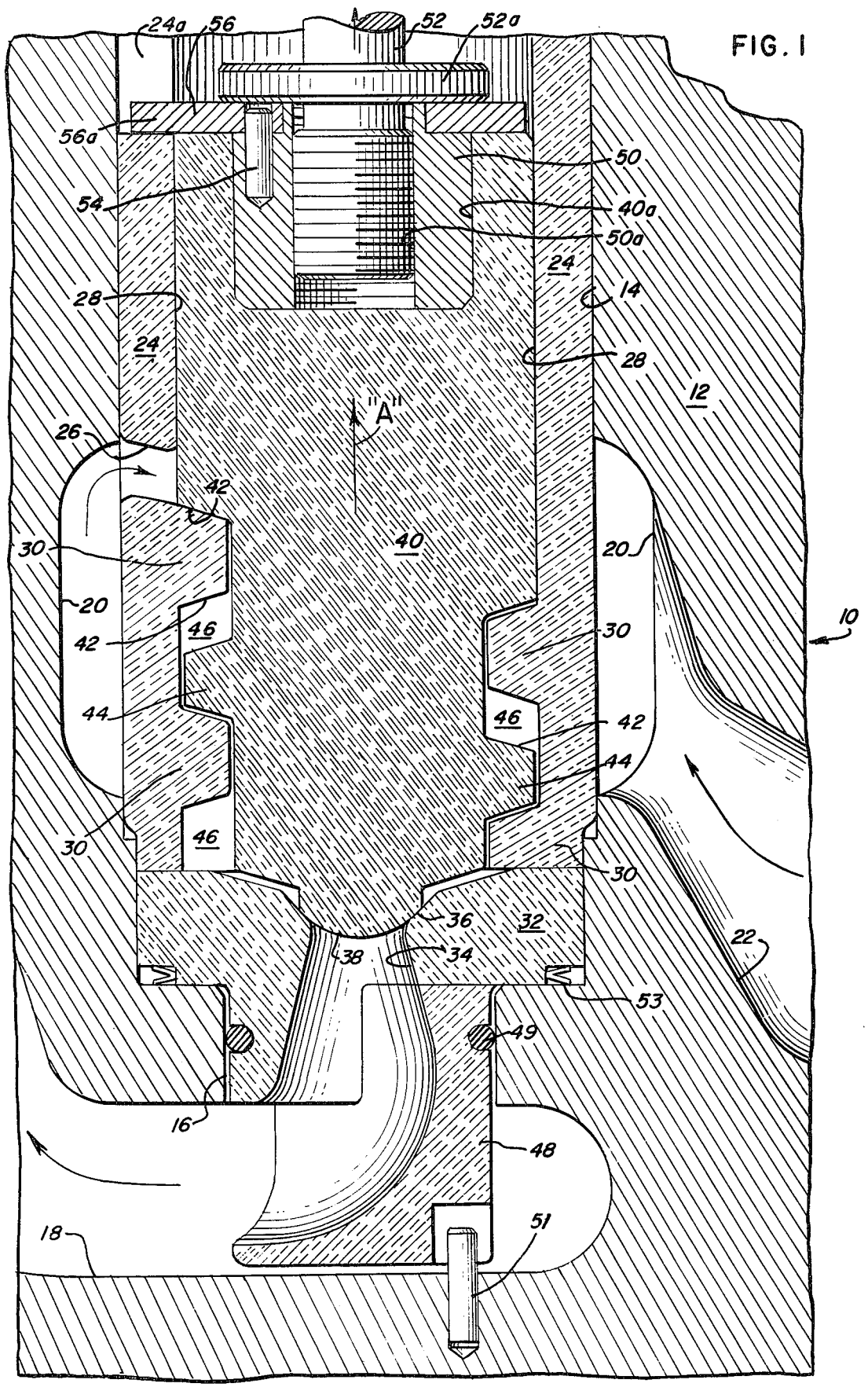
FIG. 1 is a longitudinal sectional view of a high energy loss fluid flow control device constructed in accordance with the features of the present invention.
Figure 2:
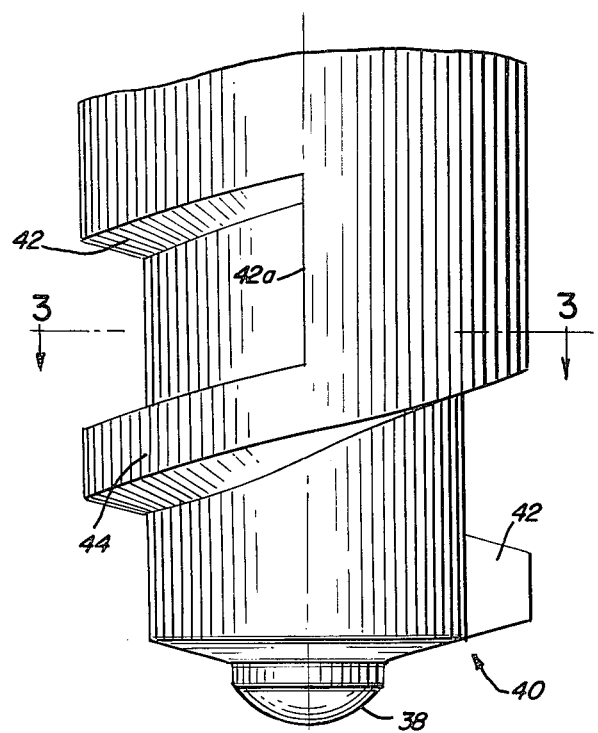
FIG. 2 is a fragmentary elevational view of a portion of the valve member of the device.
Figure 3:
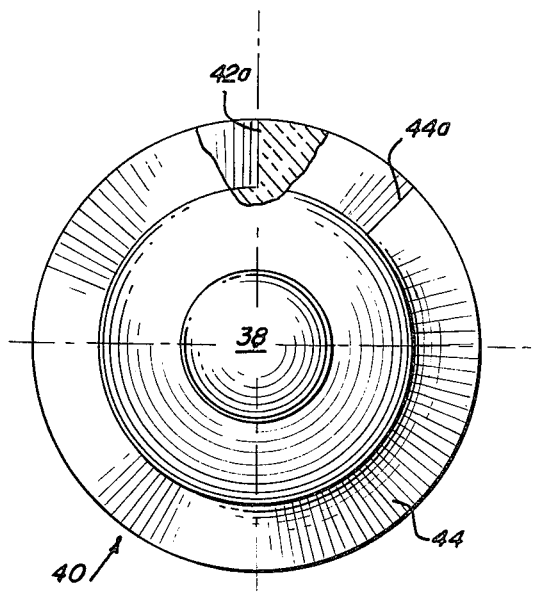
FIG. 3 is an end elevational view of the valve member of FIG. 2 with portions broken away and in section for better understanding.
Figure 4:
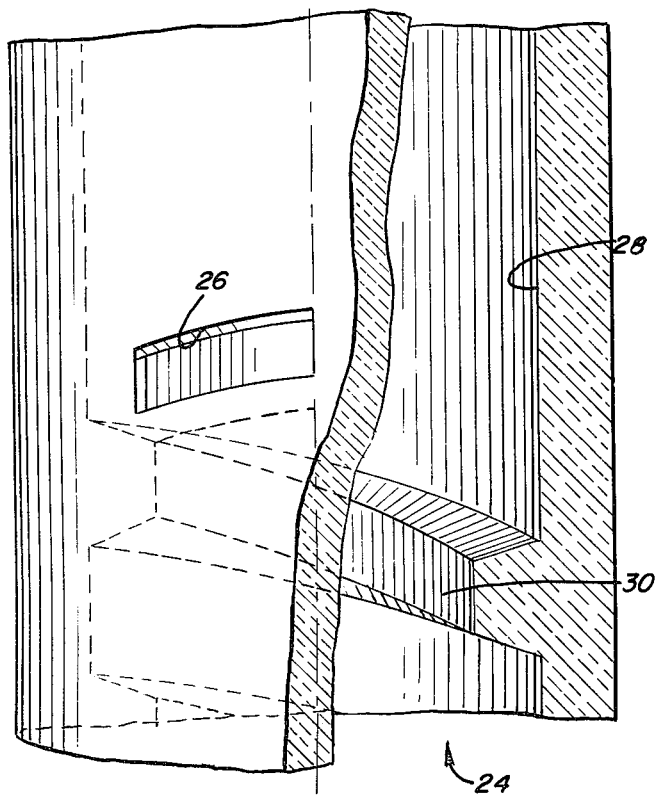
FIG. 4 is a fragmentary elevational view of the tubular trim member of the device with portions broken away and in section for better understanding.
Figure 5:
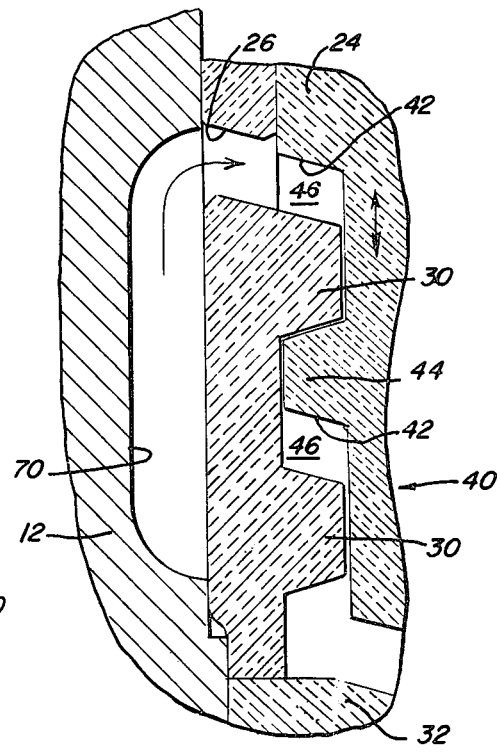
FIG. 5 is a fragmentary, longitudinal sectional view of the device showing the valve member in an open, operative position.

Referring now more particularly to FIGS. 1–5 of the drawings, therein is illustrated a new and improved high energy loss, fluid flow control device indicated generally by the reference numeral 10 and constructed in accordance with the features of the present invention. The fluid flow control device 10 will hereinafter be referred to as a let down valve and includes a body or housing 12 having a cylindrical chamber 14 defined therein in communication at an outlet end through a cylindrical opening 16 with a fluid outlet passage 18. The cylindrical chamber 14 is in communication with an annular fluid inlet passage 20 intermediate its length which passage is adapted to be connected with a supply of incoming high pressure fluid through a supply or inlet passage 22. A hollow tubular trim sleeve 24 of temperature and wear resistant ceramic material is seated in the elongated chamber 14 and is formed with a slot-like inlet opening 26 in communication with the annular inlet passage 20 of the valve body (as best shown in FIGS. 1 and 4). The hollow trim cage 24 includes a generally cylindrical inner surface or bore 28 having an internally projecting, helical thread or land 30 extending between the lower end of the trim cage and the fluid inlet slot 26 (FIG. 4). The internally projecting helical thread 30 is of a generally trapezoidal cross-section as illustrated and is similar to an "Acme" type thread. The lower end of the trim cage member buts against the upper face of an annular valve seat 32 also formed of ceramic material and including a central outlet passage 34 expanding in cross-sectional area towards the lower end in communication with the outlet passage 18 in the valve body. The valve seat is formed with a spherical annular valve seating surface 36 on the upper face around the opening 34 for seating engagement with a spherical surface 38 on the lower end of an elongated axially movable valve member of poppet 40 mounted coaxially within the hollow bore 28 of the trim cage. As best shown in FIGS. 1 and 2, the valve poppet 40 includes a generally cylindrical elongated body and is provided with a helical groove 42 of trapezoidal cross-section between a position intermediate the ends of the valve poppet (as shown in FIG. 2) and the lower end thereof. The groove 42 defines a helical thread or land 44 on the valve poppet also of trapezoidal cross-section adapted to interfit with turns of the thread or land 30 formed on the inside bore surface 28 of the surrounding trim cage 24. The poppet is formed of hard wear and temperature resistant ceramic material and the cross-section of the land 44 on the poppet valve member is of the same shape as the land 30 on the hollow trim cage. The spacing between turns of the respective lands is greater than the base width of the lands in order to provide a helical flow passage 46 defined between the interfitting lands. This flow passage communicates between the inlet slot or opening 26 in the trim cage 24 and the lower end of the valve poppet 40 and trim cage to provide a throttling flow passage for the fluid media when the valve poppet is opened.

As shown in FIG. 1, when the valve poppet 40 is in the closed position, the spherical surface 38 at the lower end of the poppet is seated against the frustroconical annular seating surface 36 on the valve seat 32 and in addition, the inlet slot 26 in the trim cage 24 is closed off by the adjacent body portion of the valve poppet (as best shown in FIG. 1). In order to open the valve and permit fluid flow from the annular inlet passage 20 down to the outlet passage 18, via the helical flow passage 46, the valve poppet 40 is moved axially in the direction of the arrow "A" of FIG. 1 and fluid enters via the inlet passage 20 in the valve body 12 through the opening 26 in the trim cage 24 into the upper end of the helical flow passage.

The ceramic poppet 40 is formed with a recess 40a in the opposite or upper end (FIG. 1) and a metal insert 50 is shrink fitted therein having a threaded axial bore 50a. An axially movable elongated valve actuator rod 52 is threadedly connected to the metal insert 50 and a key pin 54 is provided to interconnect the poppet with a stop washer 56 sandwiched between the upper end of the poppet and a flange 52a on the actuator shaft. The stop washer includes a radial lug 56a which projects into a slot 24a in the trim cage 24 to prevent relative rotation between the trim cage and poppet. Axial movement of the shaft is provided by a conventional valve actuator (not shown) for opening and closing the poppet and, as shown in FIG. 1, when the valve is in a closed position with the spherical surface 38 of the poppet seated against the mating spherical surface 36 of the valve seat 32, the inlet port 26 in the trim cage 24 is also blocked by the body of the valve poppet above the groove 42 which terminates in a major diametral plane 42a as best shown in FIGS. 2 and 3. The lower end of the land 44 of the poppet terminates on a radial plane 44a (FIG. 3) angularly spaced from the diametral terminating plane 42a of the groove 42. When the valve actuator rod 52 is moved upwardly to pen the valve, the valve poppet 40 moves away from the seat and the body of the poppet moves upwardly from the blocking position over the inlet opening 26 in the trim cage or sleeve 24. This permits the high pressure fluid from the annular inlet passage 20 to flow through the inlet opening 26 in the trim sleeve around the spiral or helical path 46. The amount of displacement of the poppet 40 from its seated or closed position determines the cross-sectional flow area of the helical passage 46 and this area can be adjusted as desired to achieve the desired flashing or expansion ratio for the fluid being used. The helical flow path 46 is relatively long and of substantial cross-sectional area when fully opened so that the velocity is kept rather low. Accordingly, any entrained solid particles which are carried in the liquid or liquid vapor stream if a liquid vapor interface is developed do not have a high kinetic energy and this results in less erosive wear on the basic fluid contacting surfaces of the valve which are formed of ceramic material. Because the seating surface 38 of the poppet 40 and the valve seat ring 32 are adjacent to the outlet end rather than the beginning of the helical flow passage 46, erosion of these parts is reduced because of the lower pressures and velocities at the outlet. In addition, shut off of fluid flow is obtained by a relatively large, line contact circle and the hard ceramic surfaces of the poppet valve and seat can readily crush any trapped solid contaminants trapped between the seating surfaces when the valve is closed. The facing helical surfaces on the respective lands or threads of the poppet and trim cage are closely spaced to one another when the poppet is almost closed as the valve is closing and at this time the flow has been substantially reduced just prior to actual poppet and valve seat contact. Again this minimizes high velocity wire drawing seat damage as the valve is shut down or upon a high pressure opening of the valve and greatly extends the valve life.

The valve can be utilized for modulating flow because axial displacement of the poppet may be used to control and vary the flow rate. A continuous distribution of energy loss is spread over a relatively long path and the noise level generated is minimal. Because the pressure drop occurs over a relatively large surface area of the ceramic parts, lower local energy dissipation is achieved with reduced wear and consequently longer valve life. Moreover, the ceramic materials as used in this construction are relatively inexpensive in comparison to the more exotic metals which would be needed to withstand similar temperatures such as 1900° F. or the like which are commonly present in coal gasification processes for which the valve is especially useful.

Figure 6:
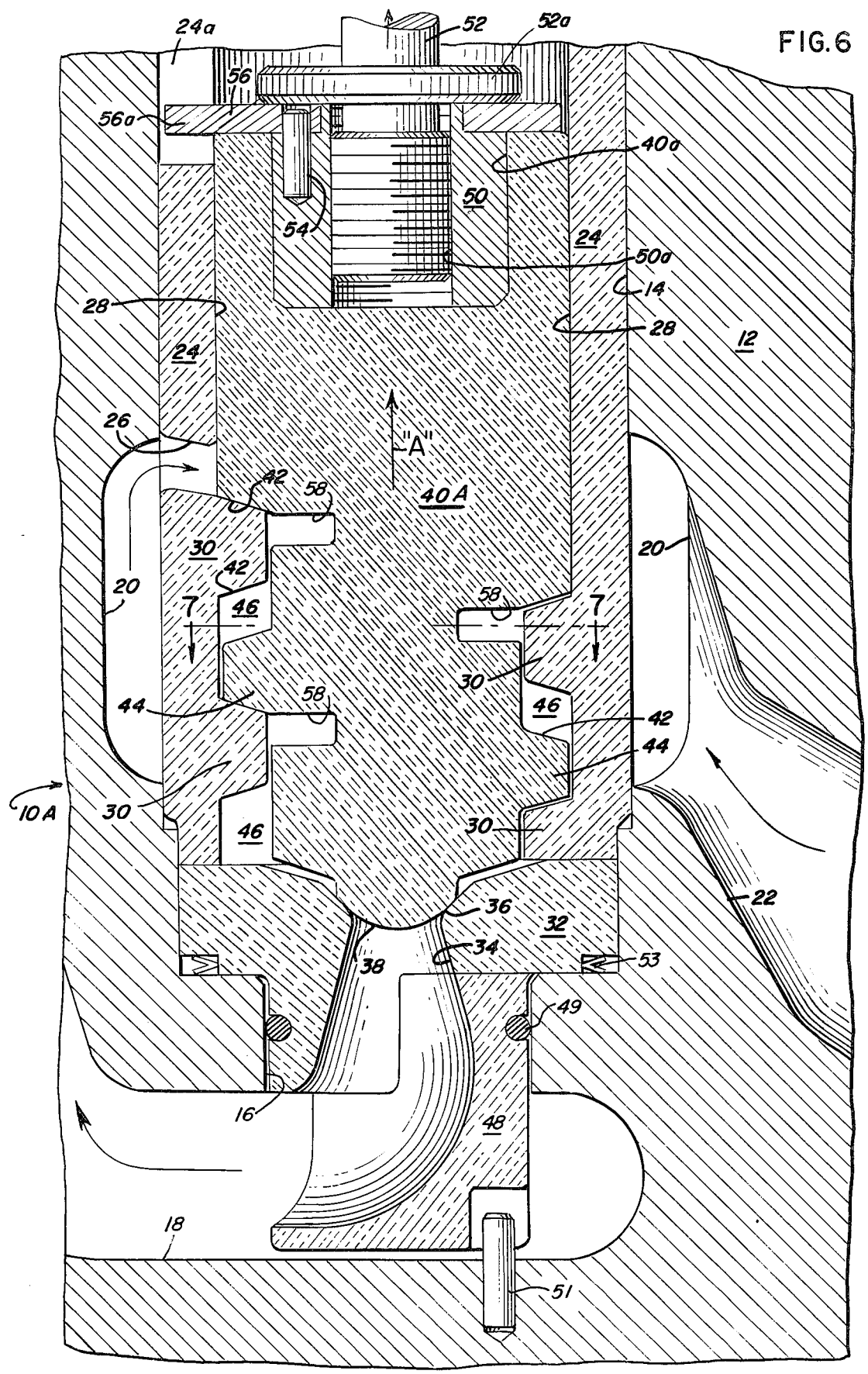
FIG. 6 is a longitudinal sectional view of another embodiment of a high energy loss fluid flow control device in accordance with the features of the present invention.
Figure 7:
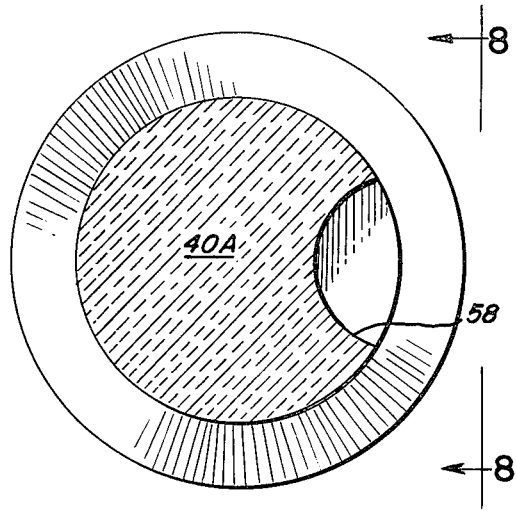
FIG. 7 is a transverse cross-sectional view taken substantially along lines 7—7 of FIG. 6.
Figure 8:
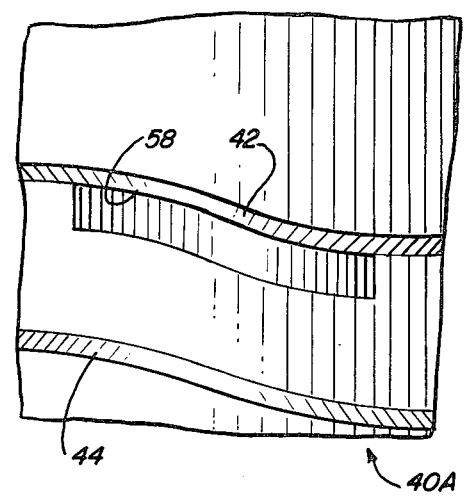
FIG. 8 is a fragmentary side elevational view of the valve member of the device of FIG. 6 illustrating an expansion cavity therein.

Referring now to FIG. 6, therein is illustrated another embodiment of a let down valve constructed in accordance with the features of the present invention and identified by the reference numeral 10A. Similar components in the valve 10A will be given identical reference numerals to those used in describing the valve 10 of the prior described embodiment and only the differences of the two embodiments will be discussed herein in detail. The valve 10A differs from the valve 10 in that a poppet 40A is modified slightly to provide for a plurality of discrete crescent or moon shape expansion chambers 58 at spaced apart locations along the helical flow path 46. These chambers are in communication with the grooves formed between adjacent turns of the helical land or thread 44 on the poppet. The discrete cavities provide for a series of rapid expansions and contractions of the fluid flow area which in conjunction with the continuous long helical flow path provides for a rapid distribution of high energy dissipation as the fluid expands. These spaced expansion chambers help to minimize the destructive fluid damage suffered when flow control hardware parts provide for a high pressure drop in a relatively small localized area.

Figure 9:
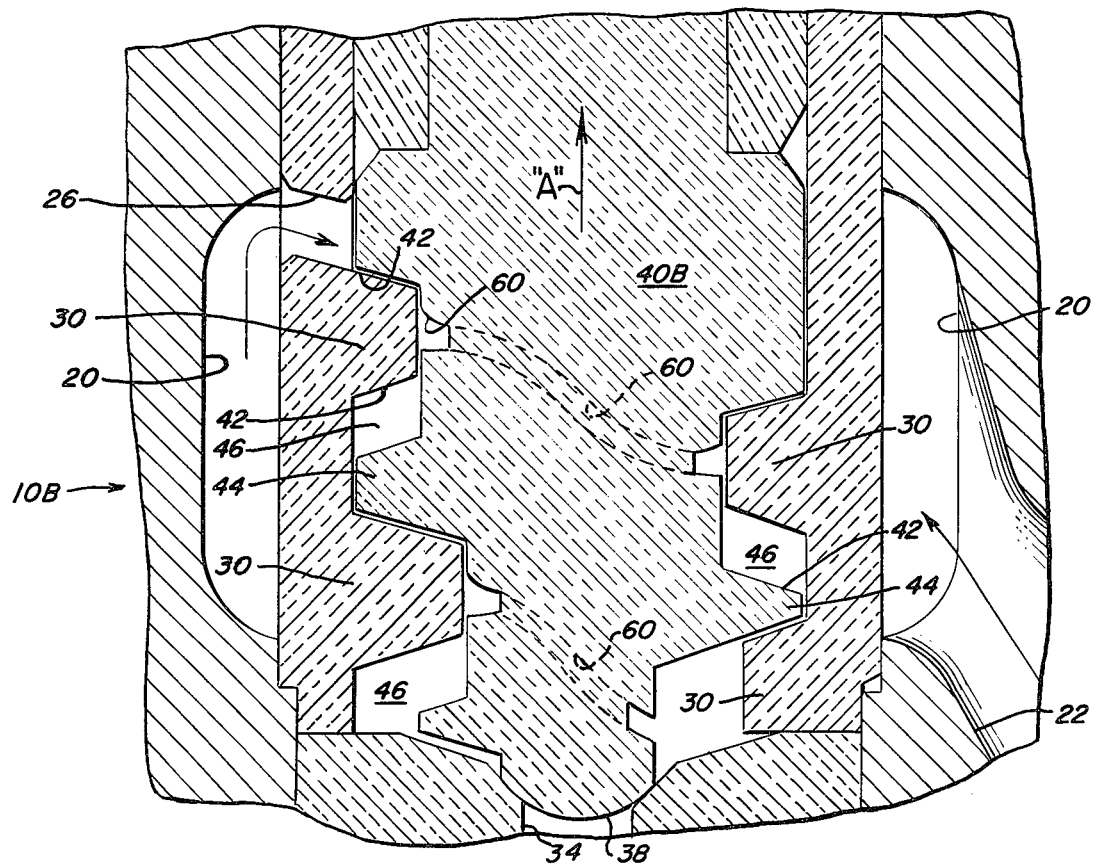
FIG. 9 is a fragmentary longitudinal sectional view of yet another embodiment of a fluid flow control device constructed in accordance with the features of the present invention.

Referring now to FIG. 9, therein is illustrated yet another embodiment of a let down valve constructed in accordance with the features of the present invention and referred to generally by the reference numeral 10B.

The let down valve 10B differs from the previous embodiments in that a valve poppet 40B is formed with a continuous undercut helical passage 60 providing a groove extending inwardly of the base of the groove 42 in the poppet which helps form the helical flow passage 46. The continuous groove 60 differs from the discrete expansion cavities 58 of the previous valve 10A in that fluid flow transfers back and forth between the main flow passage 46 and the smaller groove 60. This transfer is continuous and provides for good mixing action all along the helical flow passage. More, the undercut passage 60 is of a constant cross-sectional flow area that does not vary in relation to the position of the poppet 40B within the trim cage 24 as does the main passage 46 so that a modified flow contour can be achieved by varying the amount of opening or poppet stroke in the let down valve 10B.

Although the present invention has been described with reference to several illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A high energy loss fluid flow control device comprising:
    a body defining a generally cylindrical chamber in communication with an annular fluid inlet passage around said chamber spaced axially of a fluid outlet passage at one end of said chamber;
    a hollow tubular generally cylindrical sleeve member coaxially mounted in said chamber open at one end adjacent said outlet passage and formed with a helical internally projecting thread extending between said one end and a radial inlet opening formed in the wall of said sleeve member in communication with said annular fluid inlet passage, and a helical groove formed between adjacent turns of said thread; and
    a valve member coaxially mounted in said tubular sleeve member for axial translation relative thereto and including an outwardly projecting helical thread extending between an end of said valve member and extending into said helical groove of said tubular sleeve member, and a helical groove defined on said valve member between adjacent turns of said thread thereon for receiving said thread of said sleeve member, said threads and said grooves defining a helical flow passage therebetween extending between said inlet opening and said one end of said tubular sleeve member, said threads of said members having a similar shape in transverse cross-section and each having a transverse cross-sectional width measured axially of said members substantially less than the width of said grooves receiving the same whereby said helical flow passage has a transverse cross-sectional flow area between said interfitting threads and grooves of said members of variable dimension and spaced to enlarge and contract said flow area upon relative axial translation of said valve member in said tubular sleeve member,
    and means keying said members together permitting relative axial movement and preventing relative rotation therebetween.

2. The control device of claim 1 wherein said valve member includes a plurality of spaced apart cavities in communication with said helical flow passage between turns of said threads of said valve member for providing a plurality of intermediate expansion areas for fluid media flowing along said helical flow passage.

3. The control device of claim 1 wherein said valve member and said tubular sleeve member are formed of high temperature resistant ceramic material.

4. The control device of claim 1 wherein said outlet passage is formed in part by an annular valve seat adjacent said one end of said valve member, said one end of said valve member including a seating surface designed to seal against a confronting surface on said seat when said valve member is moved into a closed position.

5. The control device of claim 4 wherein said land of said valve member includes a surface closing off said inlet opening in said tubular sleeve member and a surface sealing against a surface adjacent said inlet opening when said valve member is in said closed position against said seat.

6. The control device of claim 5 wherein said land on said valve member is movable away from closing off said inlet opening and away from sealing against said surface of said land on said tubular sleeve member when said valve member is moved out of said closed position against said seat.

* * * * *